(12) United States Patent
Hamidi-Rad

(10) Patent No.: US 9,769,514 B2
(45) Date of Patent: Sep. 19, 2017

(54) CLOCK RECOVERY FOR VIDEO ENCODING/TRANSCODING APPLICATIONS

(71) Applicant: Harmonic, Inc., San Jose, CA (US)

(72) Inventor: Shahab Hamidi-Rad, Sunnyvale, CA (US)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 14/697,145

(22) Filed: Apr. 27, 2015

(65) Prior Publication Data

US 2016/0172006 A1    Jun. 16, 2016

Related U.S. Application Data

(60) Provisional application No. 62/092,674, filed on Dec. 16, 2014.

(51) Int. Cl.
*H04L 7/02*   (2006.01)
*H04N 21/43*  (2011.01)

(52) U.S. Cl.
CPC .............. *H04N 21/4305* (2013.01)

(58) Field of Classification Search
None
See application file for complete search history.

(56) References Cited

U.S. PATENT DOCUMENTS

| | | | | |
|---|---|---|---|---|
| 5,208,595 A * | 5/1993 | Engel | .................. | H03M 3/022 341/143 |
| 5,473,385 A * | 12/1995 | Leske | .................. | H04N 5/4401 348/464 |
| 5,548,435 A * | 8/1996 | Tahara | ................. | H04B 10/564 372/38.02 |
| 6,975,652 B1 * | 12/2005 | Mannette | .............. | H04J 3/0664 370/503 |
| 7,176,928 B1 * | 2/2007 | Sendrovitz | ................ | G06F 5/06 345/520 |

* cited by examiner

*Primary Examiner* — Wednel Cadeau
(74) *Attorney, Agent, or Firm* — Brokaw Patent Law PC; Christopher J. Brokaw

(57) ABSTRACT

Approaches for clock synchronization in digital video environments. In an embodiment, an encoder/transcoder calculates a ratio between a system clock and a source clock. The source clock is used by a source device to encode or transcode digital video. The system clock is used by the encoder/transcoder. After the encoder/transcoder receives the digital video from the source device, the encoder/transcoder uses the calculated ratio to create a recovered clock. The recovered clock is locked to a frequency of the source clock but not to the phase of the source clock. The encoder/transcoder uses the recovered clock to encode or transfer the digital video received from the source device. The encoder/transcoder ensures that the frequency of the recovered clock does not change faster than a certain rate, e.g., 0.075 Hz/second.

17 Claims, 5 Drawing Sheets

CLOCK RECOVERY FOR VIDEO ENCODING/TRANSCODING APPLICATIONS

CLAIM OF PRIORITY

This application claims priority to U.S. provisional patent application No. 62/092,674, filed Dec. 16, 2014, invented by Shahab Hamidi-Rad, entitled "Clock Recovery Algorithm for Video Encoding/transcoding Applications Optimized for CPU Performance," the contents of which are hereby incorporated by reference for all purposes as if fully set forth herein.

FIELD OF THE INVENTION

Embodiments of the invention relate to an approach for clock synchronization in digital video environments.

BACKGROUND

To ensure proper display of digital video, a clock signal of a computing environment sending encoded digital video (the "sending environment") should be synchronized with the clock signal of the computing environment receiving and playing the digital video (the "receiving environment"). To illustrate this need, assume that the sending environment is sending the digital video at a rate of thirty pictures per second in its own time base. Thus, to display the digital video as intended, the digital video should be displayed at thirty pictures per second according the time base of the sending environment. If the sending environment and the receiving environment are using clocks running at different rates, then these environments will have a different understanding of time. If this were to happen, then receiving environment could play fewer pictures per second than intended or at irregular intervals, which can result in noticeable jumps in the digital video during playback. Therefore, a need exists to lock the clock of the receiving environment to the sending environment so that both environments have the same understanding of time.

MPEG-2 is a well-known standard for digital video. While MPEG-2 is not as efficient as newer standards such as H.264 and H.265/HEVC, the need for backwards compatibility with existing hardware and software means that MPEG-2 it is widely used today.

ISO/IEC 13818-1 is a standard for synchronization and multiplexing of video and audio in compliance with MPEP-2. The ISO/IEC 13818-1 transport stream standard is also used for newer video encoding standards, such as H.264 and HEVC. Most prior art clock recovery algorithms, such as ISO/IEC 13818-1 for example, involve infinite impulse response (IIR) filters which involve numerous mathematical calculations trying to lock to both frequency and phase of the receiving environment to the sending environment. Unfortunately, such prior art clock recovery algorithms are computationally expensive.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for synchronizing a system clock to a source clock to facilitate presentation of digital video are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Most prior art clock recovery algorithms involve infinite impulse response (IIR) filters which involve numerous mathematical calculations trying to lock to both frequency and phase of a source clock. Unfortunately, such prior art clock recovery algorithms are computationally expensive, thereby diminishing their usefulness in practice. Embodiments of the invention recognize that for video encoding/transcoding applications, the phase of the clock at the sending environment need not be locked to the phase of the clock at the receiving environment. Therefore, existing clock recovery mechanisms may not be the best fit for video encoding/transcoding applications.

Embodiments of the invention shall be discussed herein for synchronizing a system clock to a source clock with particular utility in encoding/transcoding digital video. Embodiments shall be described with reference to displaying a digital video stream. To illustrate one embodiment in which the invention may be deployed, consider FIG. 1, which is a block diagram of an exemplary system of an embodiment of the invention.

Figure 1:
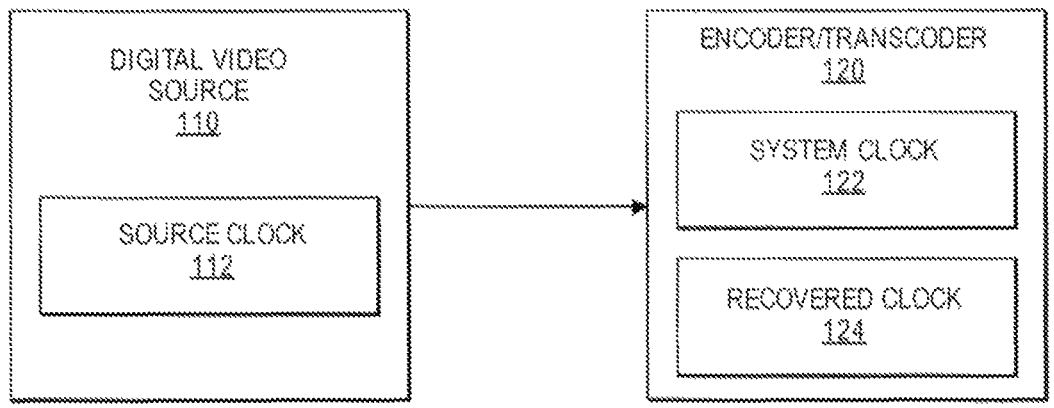
FIG. 1 is a block diagram of an exemplary system of an embodiment of the invention.

FIG. 1 depicts a digital video source 110 and encoder/transcoder 120. Digital video source 110 represents any device capable of sending encoded video over a wired or wireless network to encoder/transcoder 120. Encoder/transcoder 120 represents any hardware or software component capable of receiving digital video over a network from digital video source 110 and encoding or transcoding the received video. For example, encoder/transcoder 120 might be implemented by a product in the Electra series of encoders and transcoders available from Harmonic, Inc. of San Jose, Calif. In an embodiment, encoder/transcoder 120 may correspond to software that executes on a host operating system or on a guest operating system running in a virtual machine. While not depicted in FIG. 1 for clarify, those in the art shall appreciate that one or more intermediate network nodes may be present in the communication channel between digital video source 110 and encoder/transcoder 120.

Source clock 112 refers to the clock employed by digital video source 110 to encode digital video. System clock 122 refers to the system clock of encoder/transcoder 120. While system clock 122 is the default clock used by encoder/transcoder 120, system clock 122 will not be used when encoding or transcoding digital video received from digital video source 110. Instead, when encoder/transcoder 120 encodes or transcodes digital video received from digital video source 110, embodiments of the invention provide for encoder/transcoder 120 to periodically calculate recovered clock 124, based on a comparison of source clock 112 and system clock 122, and use recovered clock 124 to encode or transcode the digital video received from digital video source 110. Note that digital video received from digital video source 110 does not necessarily need to be encoded, as embodiments may be used with uncompressed digital video as well. For example, if digital video provided by digital video source 110 is compressed (or encoded), then encoder/transcoder 120 will transcode (decode and re-encode) the received digital video. On the other hand, if the digital video provided by digital video source 110 is uncompressed (i.e., the digital video is raw video such as SDI input), then encoder/transcoder 120 need only encode the received digital video. Embodiments of the invention can be used in both cases to lock to the incoming source.

Figure 2:
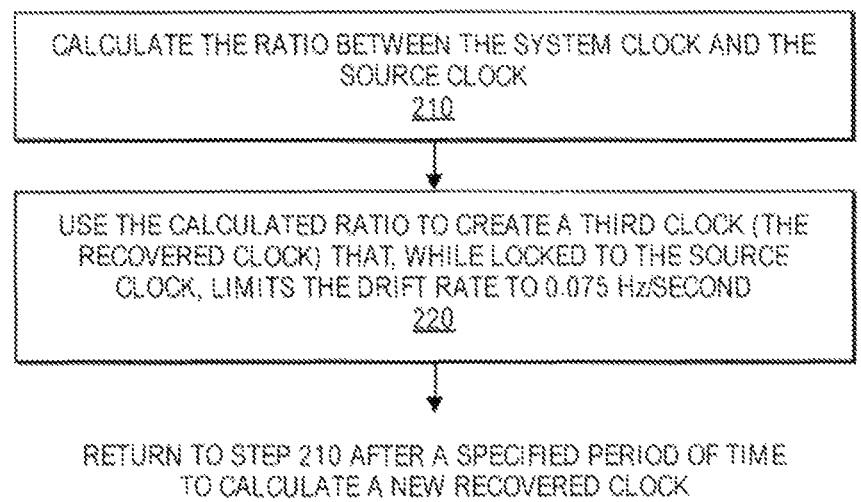
FIG. 2 is a flowchart illustrating the steps of synchronizing a system clock to a source clock to facilitate presentation of digital video according to an embodiment of the invention.

FIG. 2 is a flowchart illustrating the steps of synchronizing a system clock to a source clock to facilitate encoding or transcoding digital video according to an embodiment of the invention. Note that the steps of FIG. 2 are for the purpose of periodically calculating the parameters of recovered clock 124 for a particular period of time, e.g., about five second. Thus, the steps of FIG. 2 are intended to be repeated after the expiration of each period of time, e.g., every five seconds the steps of FIG. 2 are repeated to produce new values for the parameters of recovered clock 124. While embodiments of the invention may perform the steps of FIG. 2 to calculate the parameters of recovered clock 124 for a variety of different periods of time, discussion will be presented below regarding how often the parameters of recovered clock 124 is recalculated according to embodiments of the invention.

In step 210 of FIG. 2, a ratio between system clock 122 and source clock 112 is determined. Thereafter, in step 220, the ratio calculated in step 210 is used to create a third clock, namely recovered clock 124 depicted in FIG. 1. Recovered clock 124 is locked to the frequency of source clock 112. In an embodiment, the drift rate of recovered clock 124 is limited to 0.075 Hz/second, and as such, will remain compliant with the constraint specified by ISO/IEC 13818-1. Encoder/transcoder 120 will use recovered clock 124 in encoding or transcoding digital video received from digital video source 110. After the expiration of a period of time (for example, five seconds), encoder/transcoder 120 may repeat the steps of FIG. 2 until encoder/transcoder 120 has finished encoding or transcoding the digital video received from digital video source 110.

Advantageously, embodiments of the invention are able to synchronize a system clock to a source clock to facilitate encoding or transcoding of digital video more efficiently than prior approaches, thereby saving computational resources of encoder/transcoder 120.

Calculate the Ratio Between the System and Source Clock

In step 210 of FIG. 1, the ratio between system clock 122 and source clock 112 is determined for a particular period of time. The rationale behind step 210 is to measure the growth of the difference between source clock 112 and system clock 122 over a period of time.

In an embodiment, encoder/transcoder 120 may perform step 210. Encoder/transcoder 120 has access to system clock 122. When digital video provided by digital video source 110 is compressed (or encoded), then encoder/transcoder 120 may also access PCR information contained in packets sent from digital video source 110 and received at encoder/transcoder 120 to gain information about source clock 112. When digital video provided by digital video source 110 is not compressed, each frame of video has a timestamp that may be used to obtain information about source clock 112.

In general, the relationship between the value of system clock 122, denoted sysClock in the below equations, and the value of source clock 112, denoted srcClock in the below equations, can be expressed by a simple linear equation:

$$srcClock = m_{target} \cdot sysClock + h, \text{ where:}$$

h=the value representing the phase difference between source clock 112 and system clock 122, and $m_{target}$=the relationship between system clock 122 and source clock 112. Recovered clock 124 will be slowly adjusted over time to $m_{target}$. During the time recovered clock 124 is being slowly adjusted to $m_{target}$, the slope of recovered clock 124 vs system clock 122 can be different from $m_{target}$.

To illustrate an example of calculating h, assume $m_{target}=1$, (in other words, source clock 112 and system clock 122 have the same frequency), then:

$$srcClock = sysClock + h$$

At a specific time, the value of srcClock could be 1000 while the value of sysClock could be 5123. As a result, in this example these 2 clocks have a phase difference equal to h=4123.

Embodiments strive to calculate the value of $m_{target}$ in step 210 as accurately and quickly as possible. Note that $m_{target}$ is equivalent to $m = f_{src}/f_{sys}$, where $f_{src}$ is the frequency of source clock 112 and $f_{sys}$ is the frequency of system clock 122.

There is a certain amount of variability in the arrival time of packets carried over a network at encoder/transcoder 120. Such variability is due in part to the various routes which a packet may take from its sender to its destination. This variability is referred to as jitter. As time passes, the effect of jitter upon measuring the growth of the difference between source clock 112 and system clock 122 diminishes due to the law of averages ensuring that the number of packets arriving late and the amount which they are late is proportionate to number of packets arriving early and the amount which they are early. Moreover, certain techniques may be employed by embodiments to further reduce the impact of jitter, such as interpolation (for encapsulation jitter) and moving average (for network jitter).

The arrival time (denoted rxTime in the equation below) indicated by PCR timing information in a data packet (for compressed digital video) or by the timestamps of the video frames (for uncompressed digital video) received by encoder/transcoder 120 from digital video source 110 is equal to:

$$rxTime = sysClock + N + J$$

In the above equation, N represents the network delay (which is a constant) and J represents a random value of overall jitter. Thus, assuming no network delay and jitter, then the arrival time (rxTime) indicated in the PCR timing information in a data packet would be equal to the sysClock (system clock 122).

To make the calculation of step 210 as accurate as possible, embodiments seek to reduce the effect of jitter as much as possible. This can be done by applying an average function on the received PCR timing information contained in a PCR data packet, as shown below:

$$avgSrcClock = \frac{\sum_n srcClock}{n}$$

$$avgRxTime = \frac{\sum_n rxTime}{n} = \frac{\sum_n (sysClock + N + J)}{n} = \frac{\sum_n \left(\frac{srcClock - h}{m_{target}} + N + J\right)}{n}$$

$$= \frac{1}{m_{target}} \cdot \frac{\sum_n srcCLOCK}{n} + \frac{h}{m_{target}} + N + \sum_n J$$

Assuming:

$$\Sigma_n J \approx 0$$

Then:

$$avgRxTime = \frac{avgSrcClock}{m_{target}} + \frac{h}{m_{target}} + N$$

Thus, calculating the moving average at two different times, the difference of the moving averages, $\Delta avgRxTime$, is:

$$\Delta avgRxTime = avgRxTime(2) - avgRxTime(1)$$

$$= \frac{avgSrcClock(2)}{m_{target}} + \frac{h}{m_{target}} + N -$$

$$\left(\frac{avgSrcClock(1)}{m_{target}} + \frac{h}{m_{target}} + N\right)$$

$$= \frac{\Delta avgSrcClock}{m_{target}}$$

Solving for m:

$$targetSlope = m_{target} = \frac{\Delta avgPcrClock}{\Delta avgRxTime}$$

In the equation above, $\Delta avgPcrClock$ refers to value of the change in the average source clock 112 identified in the PCR information in a PCR data packet carrying digital video (for compressed digital video) or by the timestamps of the video frames (for uncompressed digital video) from digital video source 110 to encoder/transcoder 120, while $\Delta avgRxTime$ refers to the value of the change in the average time a packet is received by encoder/transcoder 120. In an embodiment, the ratio (termed a "target ratio") between system clock 122 and source clock 112 that in step 210 is determined for a particular period of time may be performed by calculating $\Delta avgPcrClock$ divided by $\Delta avgRxTime$ for that period of time.

Using the Calculated Ratio to Create the Recovered Clock

In step 220 of FIG. 2, the ratio between system clock 122 and source clock 112 calculated for a particular period of time is termed a "target ratio." Embodiments of the invention use this target ratio to create recovered clock 124. The value of recovered clock 124 will gradually change from the frequency of system clock 122 towards the target ratio (i.e., the ratio calculated in step 210).

Note that unlike many prior art clock recovery systems, embodiments of the invention do not try to lock the phase of recovered clock 124 to source clock 112. As a consequence, there will generally be some phase difference between recovered clock 124 and source clock 112.

Advantageously, embodiments adjust the current ratio (or slope) between recovered clock 124 and system clock 122 toward the target ratio calculated in step 210 while keeping the calculations computationally optimized and the drift rate of recovered clock 124 under the limit specified by ISO/IEC 13818-1.

In an embodiment, to perform step 220, a circular queue of linear conversion functions (equations) are maintained. Each of the linear functions in the circular queue has a different domain, range, and slope. Each linear function in the circular queue is associated with a different range of values for system clock 122. A particular linear function in the circular queue is selected for use based on which linear function in the circular queue is associated with the current value of system clock 122. The selected linear function is used to convert system clock 122 to recovered clock 124 for a fixed duration of time ($\Delta T$). During the fixed duration of time ($\Delta T$), the ratio (or slope) of recovered clock 124 to system clock 122 is constant. After the expiration of the fixed duration of time ($\Delta T$), the next linear function in the circular queue is used. During the transition from one linear function to the next, a small value ($\Delta m$) is added to the slope and this continues until we reach to the target slope calculated in step 210.

Figure 3:
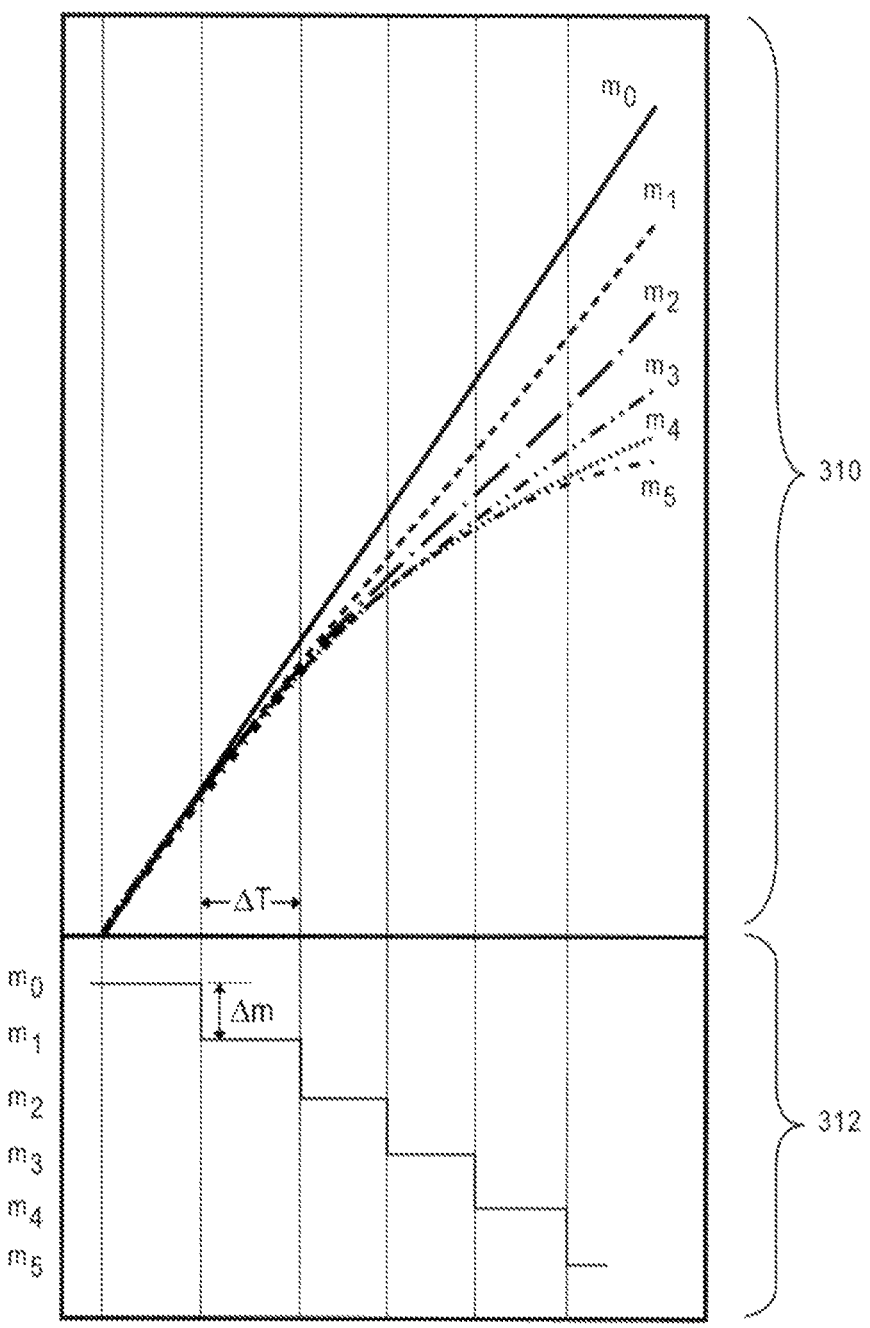
FIG. 3 is a diagram that illustrates the performance of step 220 according to an embodiment of the invention.

FIG. 3 is a diagram that illustrates the performance of step 220 according to an embodiment of the invention. Section 310 of FIG. 3 shows the lines corresponding to the initial value m0, the intermediate $m_{rco}$ values (m1, m2, m3, m4), and final (target) $m_{rco}$ value (m5) which is equal to the value calculated in step 1. Section 312 of FIG. 3 shows current value of $m_{rco}$ as it changes from m0 to m5. To illustrate a practical example, as the value of source clock 112, system clock 122, and recovered clock 124 are all very close to 27 MHz, the change in the output frequency $f_{rco}$ over the time period $\Delta T$ is less than 0.075 Hz/second.

In an embodiment, in performing step 220, all calculations are adjusted to be integer based to avoid any floating point calculations, as floating point calculations are computationally expensive. Similarly, mathematical filters (IIR, etc.) are avoided by embodiments for being computationally expensive and requiring floating point calculations.

Note that it is only necessary to lock to the frequency of source clock 112. Unlike other prior art clock recovery algorithms, according to embodiments of the invention the phase between recovered clock 124 and source clock 112 can vary. In most use cases in video encoding/transcoding applications, recovered clock 124 does not need to be phase-locked to source clock 112. In fact, sometimes it is advantageous for recovered clock 124 not to be phase-locked to source clock 112, especially when there are many error conditions (such as discontinuity and drift rate problems) present in source clock 112.

Optimizing the Calculations for Fastest Execution

In an embodiment, in performing step 220, the fixed parameters in the linear functions employed in step 220 are particularly designed to maximize the CPU performance.

In step 220, a circular queue of the linear functions is employed to convert system clock 122 values to recovered clock values 124 (and vice versa). Each linear equation in the circular queue may be defined as:

$$t = t_0 + (s - s_0) \cdot m$$

Where:
- t0 is the value of recovered clock 124 at the beginning of current period,
- s0 is the value of system clock 122 at the beginning of current period, and
- m is the slope of the line equation used to convert system clock 122 to recovered clock 124 during current period.

Figure 4:
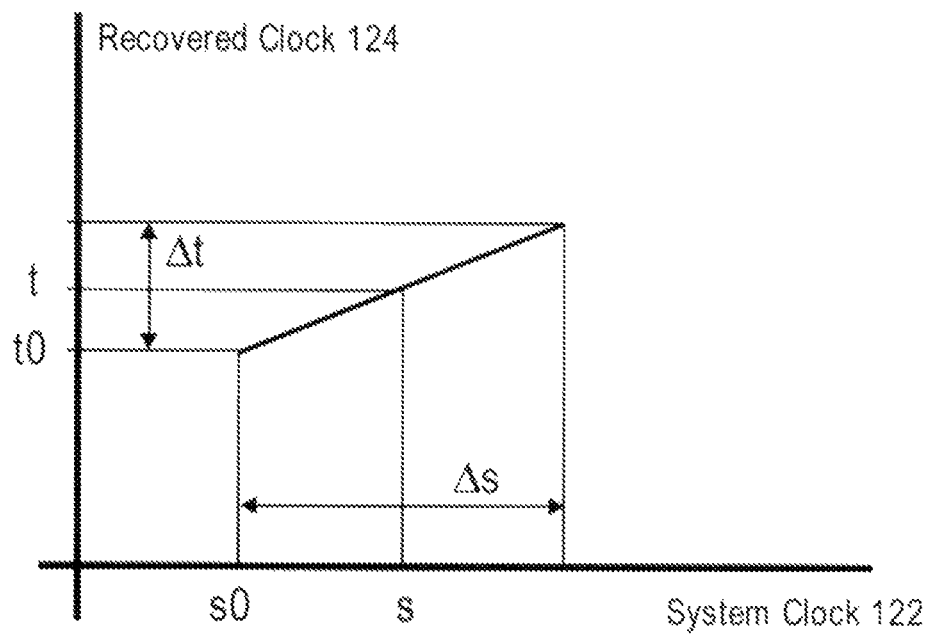
FIG. 4 is a diagram depicting the relationship of values used in converting system clock values to recovered clock values according to an embodiment of the invention.

FIG. 4 is a diagram depicting the relationship of values used in converting system clock values to recovered clock values according to an embodiment of the invention. The values s and t are the variables of the above equation. The value "s" is any system time in the range from s0 to s0+Δs. The value "t" is the corresponding recovered clock value in the range from t0 to t0+Δt, where Δt=m·Δs. FIG. 4 depicts a single equation from the queue of equations. The times before s0 and after s0+Δs depicted in FIG. 4 correspond to the previous and next equations correspondingly.

Since the frequencies of system clock 122 and recovered clock 124 are very close, the value of m is very close to 1. In order to calculate the linear functions with high precision, embodiments may represent m as a fraction of 2 integer numbers, as expressed by:

$$m_{scaled} = m \cdot K$$

where K is the scale factor.

ΔS represents the duration of the period in which the value of m is fixed, and Δm represents the absolute value of the maximum increase/decrease in the value of m in moving to the next period. For example, if current value of m is less than our target slope, then we need to increase m by increment Δm, after the expiration of every ΔS units of time, until the current value of m reaches the target m calculated in step 210.

Embodiments of the invention may use particular values of ΔS and Δm so that the linear functions employed in step 220 execute as fast as possible. Embodiments of the invention may observe certain constraints. For example, a first observed constraint is that the drift rate of recovered clock 124 should be less than 0.075 Hz/second to remain compliant with the standard ISO/IEC 13818-1. Another constraint observed by embodiments is that the values of Δm, ΔS, and K must be power of 2. As these values appear in the linear functions of step 220 frequently, it is advantageous these values to be a power of 2. This is so because the multiplication and division operations involving numbers that are a power of 2 may be performed by binary shifts left and shift right operations respectively, vastly simplifying their execution. Simplifying multiplication and division operations in this fashion results in a significant number of saved CPU cycles, as these calculations are happening hundreds or thousands of times per second.

As embodiments may use a moving average to cancel out the jitter effect on the arrival times of packets, the duration of period ΔS must be more than twice the moving average window. For this calculation, the following constraint may be employed: ΔS>81000000 (3 seconds).

Using the above definitions and the constraint, the optimal values for Δm and ΔS may be determined. The drift rate of recovered clock 124 is defined as the changes of the frequency in a period of time:

$$driftRate_{rco} = \frac{\Delta f_{rco}}{\Delta T}$$

Assuming $f_{sys}$ is constant during ΔT:

$$m = \frac{f_{rco}}{f_{sys}} \Rightarrow \Delta f_{rco} = f_{sys} \cdot \Delta m$$

Then:

$$driftRate_{rco} = \frac{\Delta f_{rco}}{\Delta T} = \frac{f_{sys} \cdot \Delta m}{\Delta T}$$

Also note that:

$$f_{sys} = 27000000 \text{ Hz}$$

$$\Delta T = \frac{\Delta S}{27000000}$$

By observing the constraint that the values of Δm, ΔS, and K are a power of 2, Δm and ΔS may be defined as follows:

Δm=2⁻ˣ (The slope increment is a very small number)

ΔS=2ʸ

Replacing in the formula for drift rate above:

$$driftRate_{rco} = \frac{f_{sys} \cdot \Delta m}{\Delta T} = \frac{27000000 \cdot 2^{-x}}{\frac{\Delta S}{27000000}} = \frac{27000000^2 \cdot 2^{-x}}{2^y} = \frac{27000000^2}{2^{x+y}}$$

By observing that the drift rate of recovered clock 124 should be less than 0.075 Hz/second:

$$driftRate_{rco} = \frac{27000000^2}{2^{x+y}} < 0.075$$

$$2^{x+y} > \frac{27000000^2}{0.075} \Rightarrow 2^{x+y} > 9720000000000000$$

-continued

By applying logarithm to both sides:

$$\log^{2x+y} > \log 9720000000000000$$

$$x+y > \frac{\log 9720000000000000}{\log 2}$$

$$x+y > 53.110$$

Using the following equation:

$$driftRate_{rco} = \frac{27000000^2}{2^{x+y}}$$

the drift rate for several different values of (x+y) may be calculated. The following table simplifies the selection of best value for x+y:

| x + y | Drift Rate | Comments |
|---|---|---|
| 53 | 0.081 | Not compliant (more than 0.075) |
| 54 | 0.040 | Compliant |
| 55 (and more) | 0.020 (and less) | Compliant but too slow |

Consequently, the best choice is:

$$x+y=54$$

By observing the constraint that $\Delta S > 81000000$ (3 seconds), the following may be determined:

$$2^y > 81000000$$

$$y > \frac{\log 81000000}{\log 2} = 26.721$$

To have a smooth drift in the frequency of recovered clock 124, embodiments make small changes to recovered clock 124 more frequently. As a result, it is desirable to use the smallest possible values for $\Delta S$ and $\Delta m$. Therefore, the best choices for x and y values are:

$$x=27$$

$$y=27$$

Any other combination of x and y values would result in a larger value for either $\Delta S$ or $\Delta m$. Consequently, the best values for $\Delta m$ and $\Delta S$ are:

$$\Delta S=2^{27}=134217728 (\Delta T=4.971 \text{ Seconds})$$

$$\Delta m=2^{-27}=0.00000000745$$

As illustrated above, the optimal value for $\Delta T$ is 4.97 seconds. As such, many embodiments may use a value of 5 seconds for $\Delta T$, although embodiments may employ value for $\Delta T$. For example, certain embodiments may use a value from 4-6 seconds for $\Delta T$. Also, note that K must be a number that is more than $1/\Delta m$. Embodiment use $2^{31}$ as the value for K.

Figure 5:
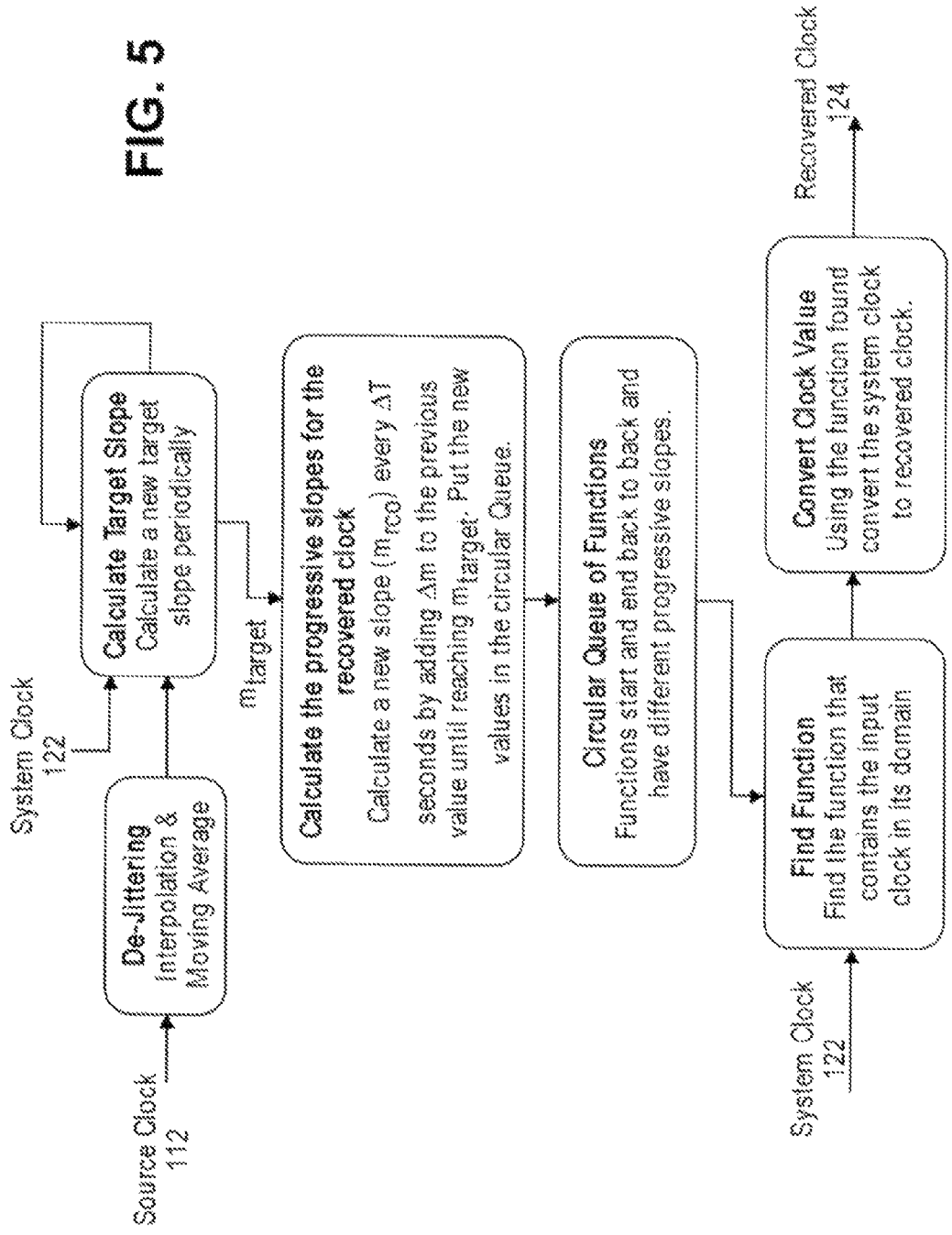
FIG. 5 is a flowchart illustrating the steps of calculating a recovered clock according to an embodiment of the invention.

FIG. 5 is a flowchart illustrating the steps of calculating a recovered clock according to an embodiment of the invention. The flowchart of FIG. 5 depicts the above discussion of the approach of FIG. 2 but in additional detail. Advantageously, embodiments of the invention are able to facilitate the presentation of digital video, which has been sent from digital video source 110, on encoder/transcoder 120 more efficiently than prior approaches using recovered clock 124, thereby saving computational resources of encoder/transcoder 120.

Hardware Mechanisms

Figure 6:
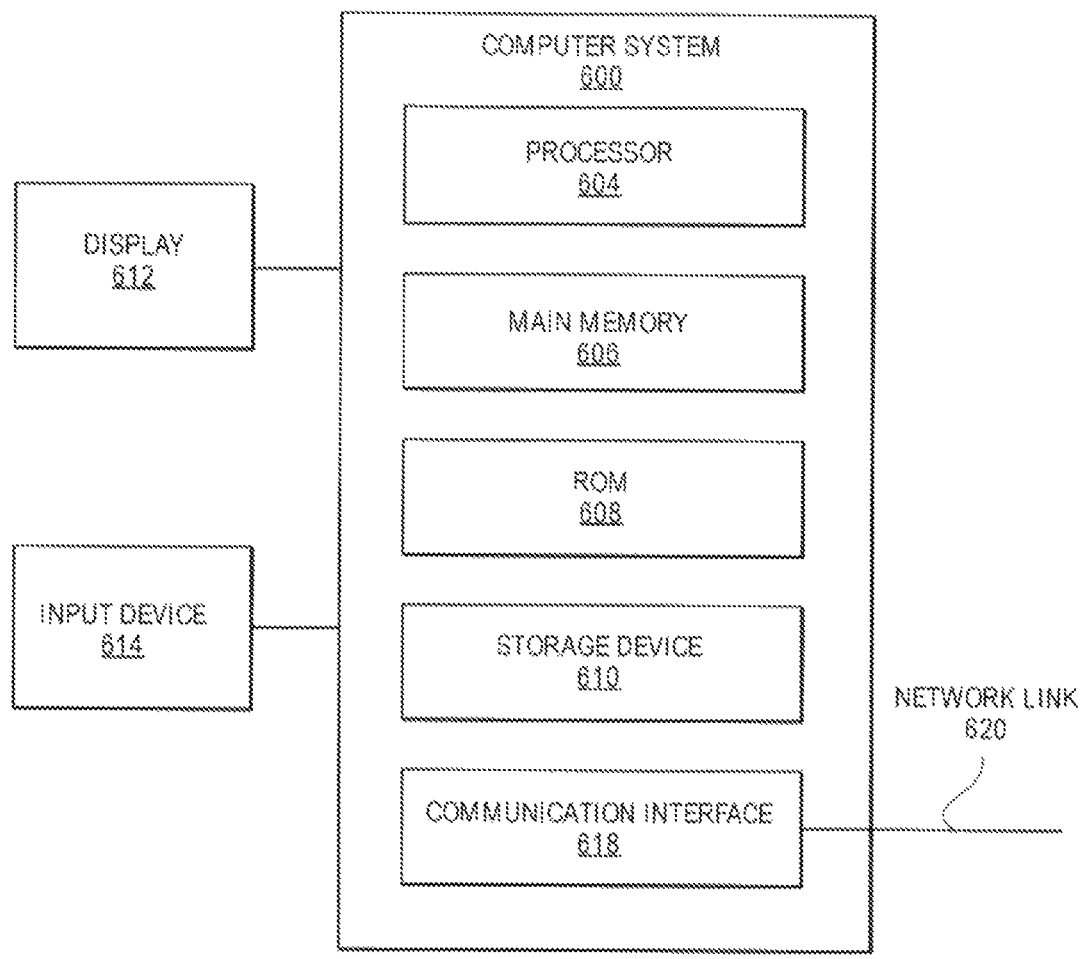
FIG. 6 is a block diagram that illustrates a computer system upon which an embodiment of the invention may be implemented.

In an embodiment, one or more of digital video source 110 and encoder/transcoder 120 depicted in FIG. 1 may be implemented on or using one or more computer systems. FIG. 6 is a block diagram that illustrates a computer system 600 upon which an embodiment of the invention may be implemented. In an embodiment, computer system 600 includes processor 604, main memory 606, ROM 608, storage device 610, and communication interface 618. Computer system 600 includes at least one processor 604 for processing information. Computer system 600 also includes a main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device for storing static information and instructions for processor 604. A storage device 610, such as a magnetic disk or optical disk, is provided for storing information and instructions.

Computer system 600 may be coupled to a display 612, such as a cathode ray tube (CRT), a LCD monitor, and a television set, for displaying information to a user. An input device 614, including alphanumeric and other keys, is coupled to computer system 600 for communicating information and command selections to processor 604. Other non-limiting, illustrative examples of input device 614 include a mouse, a trackball, or cursor direction keys for communicating direction information and command selections to processor 604 and for controlling cursor movement on display 612. While only one input device 614 is depicted in FIG. 6, embodiments of the invention may include any number (including none) of input devices 614 coupled to computer system 600. Indeed, certain embodiments may lack any type of input device or may simply have the capacity to connect to an input device.

Embodiments of the invention are related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 604 for execution. For example, the instructions may initially be carried on a magnetic disk of a remote computer. The remote computer can load the instructions into its dynamic memory and send the instructions over a network link 620 to computer system 600.

Communication interface 618 provides a two-way data communication coupling to a network link 620 that is connected to a local network. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through a local network to a host computer or to data equipment operated by an Internet Service Provider (ISP).

Computer system 600 can send messages and receive data, including program code, through the network(s), network link 620 and communication interface 618. For example, a server might transmit a requested code for an application program through the Internet, a local ISP, a local network, subsequently to communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for synchronizing a system clock to a source clock, which when executed by one or more processors, cause:
    a digital video encoder/transcoder calculating a ratio between the system clock and the source clock, wherein the system clock is used by the digital video encoder/transcoder; and
    the digital video encoder/transcoder using the calculated ratio to create a recovered clock that is locked to a frequency of the source clock but not to the phase of the source clock by:
        maintaining a circular queue of linear conversion functions, and
        selecting a particular linear conversion function, from said circular queue, to create said recovered clock for a fixed duration of time; and
    the digital video encoder/transcoder using said recovered clock for said fixed duration of time to encode or transcode digital video received from a source that uses said source clock.

2. The non-transitory computer-readable storage medium of claim 1, wherein the digital video encoder/transcoder using the calculated ratio to create the recovered clock comprises:
    the digital video encoder/transcoder ensuring that the frequency of the recovered clock does not change more than 0.075 Hz/second.

3. The non-transitory computer-readable storage medium of claim 1, wherein the digital video encoder/transcoder using the calculated ratio to create a recovered clock comprises:
    the digital video encoder/transcoder, after expiration of a period of time, recalculate the calculated ratio to create a new calculated ratio; and
    the digital video encoder/transcoder using the new calculated ratio to create a new recovered clock.

4. The non-transitory computer-readable storage medium of claim 1, wherein during said fixed duration of time, a ratio of said recovered clock to said system clock is constant.

5. The non-transitory computer-readable storage medium of claim 1, wherein the digital video encoder/transcoder using the calculated ratio to create the recovered clock comprises:
    after expiration of said fixed duration of time, selecting a next linear conversion function, after said particular linear conversion function in said circular queue, to create said recovered clock for a new fixed duration of time.

6. The non-transitory computer-readable storage medium of claim 1, wherein values of a scale factor (K) used in said particular linear conversion function, a change in the slope of a line equation used to convert said system clock to said recovered clock ($\Delta m$), and a duration of time in which said slope of said line equation is fixed ($\Delta s$) are values which are the power of 2.

7. The non-transitory computer-readable storage medium of claim 3, wherein said period of time is between 4-6 seconds.

8. The non-transitory computer-readable storage medium of claim 6, wherein K has a value greater than $1/\Delta m$.

9. An apparatus for synchronizing a system clock to a source clock, comprising:
    one or more processors; and
    one or more non-transitory computer-readable storage mediums storing one or more sequences of instructions, which when executed, cause:
        a digital video encoder/transcoder calculating a ratio between the system clock and the source clock, wherein the system clock is used by the digital video encoder/transcoder; and
        the digital video encoder/transcoder using the calculated ratio to create a recovered clock that is locked to a frequency of the source clock but not to the phase of the source clock by:

maintaining a circular queue of linear conversion functions, and selecting a particular linear conversion function, from said circular queue, to create said recovered clock for a fixed duration of time; and the digital video encoder/transcoder using said recovered clock for said fixed duration of time to encode or transcode digital video received from a source that uses said source clock.

10. The apparatus of claim 9, wherein the digital video encoder/transcoder using the calculated ratio to create the recovered clock comprises:

the digital video encoder/transcoder ensuring that the frequency of the recovered clock does not change more than 0.075 Hz/second.

11. The apparatus of claim 9, wherein the digital video encoder/transcoder using the calculated ratio to create a recovered clock comprises:

the digital video encoder/transcoder, after expiration of a period of time, recalculate the calculated ratio to create a new calculated ratio; and the digital video encoder/transcoder using the new calculated ratio to create a new recovered clock.

12. The apparatus of claim 9, wherein during said fixed duration of time, a ratio of said recovered clock to said system clock is constant.

13. The apparatus of claim 11, wherein said period of time is between 4-6 seconds.

14. A method for synchronizing a system clock to a source clock, comprising:

a digital video encoder/transcoder calculating a ratio between the system clock and the source clock, wherein the system clock is used by the digital video encoder/transcoder; and the digital video encoder/transcoder using the calculated ratio to create a recovered clock that is locked to a frequency of the source clock but not to the phase of the source clock by:

maintaining a circular queue of linear conversion functions, and selecting a particular linear conversion function, from said circular queue, to create said recovered clock for a fixed duration of time; and the digital video encoder/transcoder using said recovered clock for said fixed duration of time to encode or transcode digital video received from a source that uses said source clock.

15. The method of claim 14, wherein the digital video encoder/transcoder using the calculated ratio to create the recovered clock comprises:

the digital video encoder/transcoder ensuring that the frequency of the recovered clock does not change more than 0.075 Hz/second.

16. The method of claim 14, wherein the digital video encoder/transcoder using the calculated ratio to create a recovered clock comprises:

the digital video encoder/transcoder, after expiration of a period of time, recalculate the calculated ratio to create a new calculated ratio; and the digital video encoder/transcoder using the new calculated ratio to create a new recovered clock.

17. The method of claim 16, wherein said period of time is between 4-6 seconds.

* * * * *